(12) United States Patent
Tsai et al.

(10) Patent No.: US 9,745,433 B2
(45) Date of Patent: Aug. 29, 2017

(54) ION EXCHANGE MEMBRANE

(71) Applicant: INDUSTRIAL TECHNOLOGY RESEARCH INSTITUTE, Hsinchu (TW)

(72) Inventors: Cheng-Hsiu Tsai, Hsinchu (TW); Li-Duan Tsai, Hsinchu (TW); Chiu-Tung Wang, Tianwei Township (TW); Chiu-Hun Su, Hsinchu (TW); Yueh-Wei Lin, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/136,086

(22) Filed: Apr. 22, 2016

(65) Prior Publication Data

US 2017/0183464 A1 Jun. 29, 2017

(30) Foreign Application Priority Data

Dec. 28, 2015 (TW) .............................. 104143991 A

(51) Int. Cl.
*C08F 32/08* (2006.01)
*C08G 65/48* (2006.01)
(Continued)

(52) U.S. Cl.
CPC ........... *C08J 5/2256* (2013.01); *B01J 41/125* (2013.01); *C08G 61/02* (2013.01);
(Continued)

(58) Field of Classification Search
USPC .......................................... 526/280; 429/492
See application file for complete search history.

(56) References Cited

U.S. PATENT DOCUMENTS 3,935,086 A 1/1976 Misumi et al.
4,020,142 A 4/1977 Davis et al.
(Continued)

FOREIGN PATENT DOCUMENTS

CN 102695741 A 9/2012
CN 104693423 A 6/2015
(Continued)

OTHER PUBLICATIONS

Wiesenauer et al., "Synthesis and Ordered Phase Separation of Imidazolium-Based Alkyl-Ionic Diblock Copolymers Made via ROMP", Macromolecules, vol. 44, pp. 5075-5078 (2011).*
(Continued)

*Primary Examiner* — Mark Kaucher
*Assistant Examiner* — Henry Hu
(74) *Attorney, Agent, or Firm* — Birch, Stewart, Kolasch & Birch, LLP

(57) ABSTRACT

An ion exchange membrane is provided. The ion exchange membrane includes a reaction product of a polymer and a cross-linking reagent. The polymer includes a first repeat unit, and a second repeat unit. In particular, the first repeat unit is and, the second repeat unit is wherein $R^+$ is $A^-$ is $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^-$; X is $-(CH_2)_i-Y-(CH_2)_j-$, i and j are independently 0, or an integer from 1 to 4; Y is $-O-$, $-S-$, $-CH_2-$, or $-NH-$; $R^1$ is independently $C_{1-8}$ alkyl group; and, $R^2$ and $R^3$ are hydrogen, or independently $C_{1-8}$ alkyl group; and, the cross-linking reagent is a compound having at least two imide groups.

12 Claims, No Drawings

(51) Int. Cl.
*C08J 5/22* (2006.01)
*B01J 41/12* (2017.01)
*C08G 61/02* (2006.01)

(52) U.S. Cl.
CPC ... *C08G 2261/12* (2013.01); *C08G 2261/149* (2013.01); *C08G 2261/1412* (2013.01); *C08G 2261/3325* (2013.01); *C08G 2261/418* (2013.01); *C08G 2261/516* (2013.01); *C08J 2365/00* (2013.01)

(56) References Cited

U.S. PATENT DOCUMENTS

| | | | |
|---|---|---|---|
| 5,603,985 A | 2/1997 | Kent et al. | |
| 6,426,171 B1 | 7/2002 | Jung et al. | |
| 7,785,726 B2 | 8/2010 | Yoshida et al. | |
| 7,868,051 B2 | 1/2011 | Fukuta et al. | |
| 8,223,472 B1 | 7/2012 | Dirk et al. | |
| 8,241,770 B2 | 8/2012 | Yoshida et al. | |
| 8,436,057 B1 | 5/2013 | Verkade et al. | |
| 8,765,893 B2* | 7/2014 | Bell | B01D 71/44 429/492 |
| 8,765,894 B2 | 7/2014 | Bell et al. | |
| 2003/0023001 A1 | 1/2003 | Kerr et al. | |
| 2006/0105215 A1 | 5/2006 | Panambur et al. | |
| 2006/0223895 A1 | 10/2006 | Yoshida et al. | |
| 2010/0297529 A1 | 11/2010 | Yoshida et al. | |
| 2012/0157579 A1 | 6/2012 | Parent et al. | |

FOREIGN PATENT DOCUMENTS

| | | | |
|---|---|---|---|
| DE | 10006694 A1 | | 8/2001 |
| JP | 2009-203455 A | | 9/2009 |
| TW | 200827026 | * | 7/2008 |
| TW | 200827026 A | | 7/2008 |
| WO | WO 98/27423 A1 | | 6/1998 |

OTHER PUBLICATIONS

Nguyen et al., "Effect of composition and nanostructure on CO2/N2 transport properties of supported alkyl-imidazolium block copolymer membranes", J. Membrane Science, vol. 430, pp. 312-320 (2013).*

Yang et al.,"1,2-Dimethylimidazolium-functionalized cross-linked alkaline anion exchange membranes for alkaline direct methanol fuel cells", International Journal of Hydrogen Energy, vol. 40, pp. 2363-2370 (2015).*

Cheng et al., "A mini-review on anion exchange membranes for fuel cell applications: Stability issue and addressing strategies", International Journal of Hydrogen Energy, vol. 40, pp. 7348-7360 (2015).*

Autenrieth et al., "Reactivity of the Dicationic Ruthenium-Alkylidene Complex [Ru(DMF)3(IMesH2)(=CH—2—(2—PrO)—C6H4)], 2+(BF4-)2] in Ring-Opening Metathesis and Cyclopolymerization", Macromolecular Chemistry and Physics, 2013, 214, pp. 33-40.

Biondi et al., "Synthesis of Gold Nanoparticle Catalysts Based on a New Water-Soluble Ionic Polymer", Inorganic Chemistry, 2011, 50, pp. 8038-8045.

Cheng et al., "A mini-review on anion exchange membranes for fuel cell applications: Stability issue and addressing strategies", International Journal of Hydrogen Energy, 2015, 40, pp. 7348-7360.

Kim et al., "Resonance Stabilized Perfluorinated Ionomers for Alkaline Membrane Fuel Cells", Macromolecules, 2013, 46, pp. 7826-7833.

Nguyen et al., "Effect of composition and nanostructure on CO2/N2 transport properties of supported alkyl-imidazolium block copolymer membranes", Journal of Membrane Science, 2013, 430, pp. 312-320.

Pan et al., "Constructing ionic highway in alkaline polymer electrolytes", Energy & Environmental Science, 2014; 7, pp. 354-360.

Rao, et al., Comb-shaped alkyl imidazolium-functionalized poly(arylene ether sulfone)s as high performance anion-exchange membranes, Journal of Materials Chemistry A, 2015, 3, pp. 8571-8580.

Varcoe et al., "Anion-exchange membranes in electrochemical energy systems", Energy & Environmental Science, 2014, 7, pp. 3135-3191.

Wiesenauer et al., "Synthesis and Ordered Phase Separation of Imidazolium-Based Alkyl—Ionic Diblock Copolymers Made via ROMP", Macromolecules, 2011, 44, pp. 5075-5078.

Yang et al., "1,2-Dimethylimidazolium-functionalized cross-linked alkaline anion exchange membranes for alkaline direct methanol fuel cells", International Journal of Hydrogen Energy, 2015, 40, pp. 2363-2370.

Taiwanese Office Action and Search Report dated May 25, 2016, for Taiwanese Application No. 104143991.

Extended European Search Report, dated Jun. 13, 2017, for European Application No. 16172051.1.

Liaw et al., "Amphiphilic Macromolecular Nanostructure Materials Derived from 5-(octanoate methyl)bicyclo[2.2.1]hept-2-ene and 5-(phthalimide methyl)bicyclo[2.2.1]hept-2-ene via Ring-opening . . . ," Polymer, vol. 48, No. 13, Jun. 5, 2007 (Available online Apr. 24, 2007), pp. 3694-3702, XP022105802.

Liaw et al., "Novel Active Ester-Bridged Copolynorbornene Materials Containing Terminal Functional Hydroxyl, Amino, Methacryloyl, or Ammonium Groups via Ring-Opening . . . ," Journal of Polymer Science: Part A: Polymer Chemistry, vol. 43, No. 18, Jan. 2005, pp. 4233-4247, XP055376779.

Liaw et al., "Self-Assembly Aggregation of Highly Stable Copolynorbornenes with Amphiphilic Architecture via Ring-Opening Metathesis Polymerization," Macromolecules, vol. 38, No. 8, 2005 (Published on Web Mar. 25, 2005), pp. 3533-3538, XP055376774.

Zha et al., "Metal-Cation-Based Anion Exchange Membranes," J. Am. Chem. Soc., vol. 134, No. 10, Mar. 2, 2012, pp. 4493-4496, XP055376769.

* cited by examiner

ION EXCHANGE MEMBRANE

CROSS REFERENCE TO RELATED APPLICATIONS

The application is based on, and claims priority from, Taiwan Application Serial Number 104143991, filed on Dec. 28, 2015, the disclosure of which is hereby incorporated by reference herein in its entirety.

TECHNICAL FIELD

The technical field relates to an ion exchange membrane.

BACKGROUND

Ion exchange membranes are widely used in electrodialysis purification, fuel cells, electroplating, and the food industry.

An ion exchange membrane includes a polymer material having negatively charged groups or positively charged groups serving as the film body, and migratable cations or anions under electrical or chemical potential. A cation exchange membrane has negatively charged groups fixed on the polymer and migratable cations. Identically, an anion exchange membrane has positively charged groups fixed on the polymer and migratable anions. In general, the characteristics of the ion exchange membrane are determined by the number, type, and distribution of the fixed charged group. Anion exchange membranes made of conventional polymer material are not suitable for use in an ion exchange membrane fuel cell, due to the poor solubility, mechanical strength, and solvent selectivity of the conventional polymer material.

SUMMARY

According to an embodiment of the disclosure, the disclosure provides an ion exchange membrane including a reaction product of a polymer and a cross-linking agent. The polymer includes a first repeat unit and a second repeat unit, wherein the first repeat unit can be

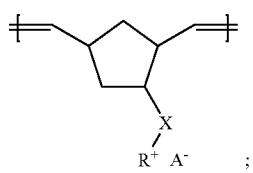

the second repeat unit can be

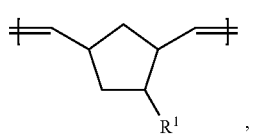

wherein $R^+$ can be

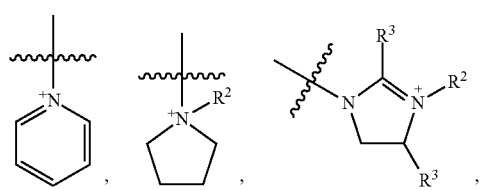

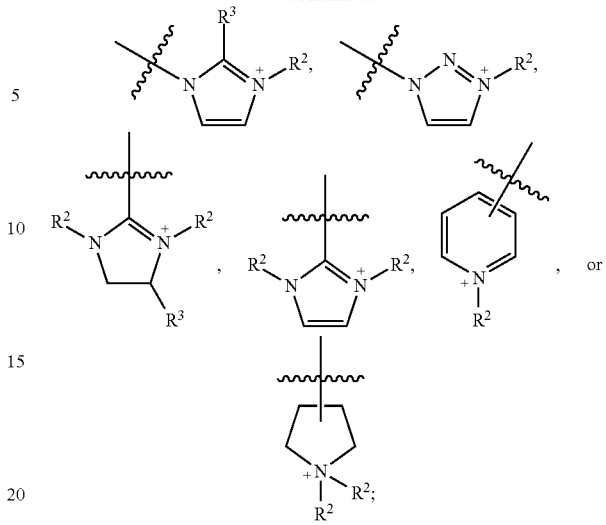

$A^-$ can be $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^-$; X can be $-(CH_2)_i-Y-(CH_2)_j-$, i and j can be independently 0, or an integer from 1 to 6, Y can be —O—, —S—, —CH$_2$—, or —NH—; $R^1$ can be independently $C_{1-8}$ alkyl group; and, $R^2$ and $R^3$ can be independently hydrogen, or $C_{1-8}$ alkyl group. Furthermore, the cross-linking agent can be a compound having at least two maleimide groups.

A detailed description is given in the following embodiments with reference to the accompanying drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

The disclosure provides an ion exchange membrane, such as an intrinsic anion exchange membrane. The ion exchange membrane is prepared from a polymer with a stable cyclic conjugated cationic group (such as an imidazole group) serving as an ion exchange group. Furthermore, since the cross-linking agent has at least two imide groups, the maleimide group can be reacted with the cyclic conjugated cationic group, resulting in the increase of film forming ability. Furthermore, due to the specific polymer and cross-linking agent, the ion exchange membrane of the disclosure exhibits high mechanical strength, high dimensional stability, and high ionic conductivity. Furthermore, the cross-linking agent can be a polymeric cross-linking agent, and the polymer and the polymeric cross-linking agent can form an interpenetrating polymer network, thereby enhancing the mechanical strength and dimensional stability of the ion exchange membrane.

The ion exchange membrane can include a reaction product of a polymer and a cross-linking agent. In the design of the structure, due to the introduction of stably cationic group of the polymer, the ion exchange membrane of the disclosure exhibits high ionic conductivity. Furthermore, due to the introduction of non-ionic group of the polymer, the ion exchange membrane of the disclosure also exhibits high solubility.

According to an embodiment of the disclosure, the polymer of the disclosure includes a first repeat unit and a second repeat unit. The first repeat unit can be

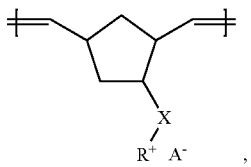

wherein R+ can be

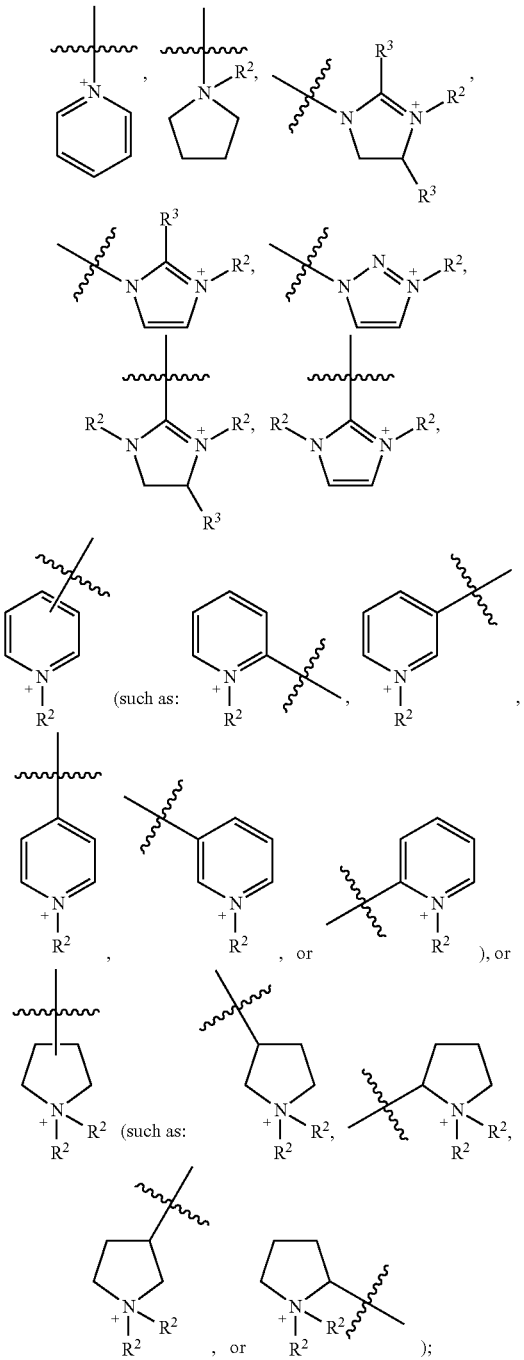

A⁻ can be F⁻, Cl⁻, Br⁻, I⁻, OH⁻, HCO₃⁻, HSO₄⁻, SbF₆⁻, BF₄⁻, H₂PO₄⁻, H₂PO₃⁻, or H₂PO₂⁻; X is —(CH₂)ᵢ—Y—(CH₂)ⱼ—, i and j can be independently 0, or an integer from 1 to 6, Y can be —O—, —S—, —CH₂—, or —NH—; and, $R^2$ and $R^3$ can be independently hydrogen, or $C_{1-8}$ alkyl group (such as: methyl, ethyl, propyl, isopropyl, n-butyl, sec-butyl, isobutyl, tert-butyl, pentyl, hexyl, cyclohexyl, cyclopentyl, heptyl, or octyl). In addition, the second repeat unit can be

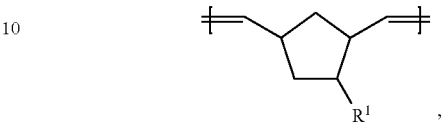

wherein $R^1$ can be independently $C_{1-8}$ alkyl group (such as methyl, ethyl, propyl, isopropyl, n-butyl, sec-butyl, isobutyl, tert-butyl, pentyl, hexyl, cyclohexyl, cyclopentyl, heptyl, or octyl).

According to embodiments of the disclosure, the polymer of the disclosure has a molecular weight (such as number average molecular weight) between about 100,000 and 250,000.

According to embodiments of the disclosure, the first repeat unit can be

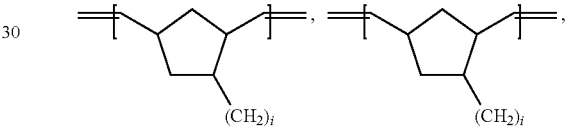

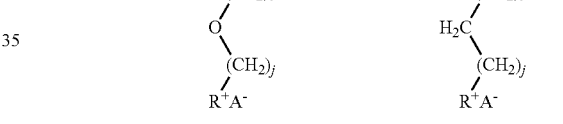

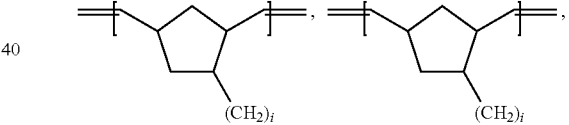

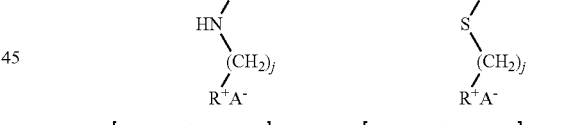

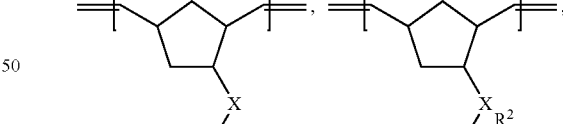

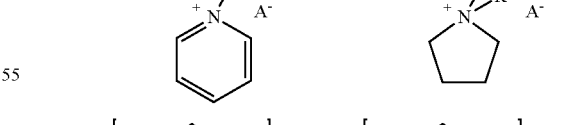

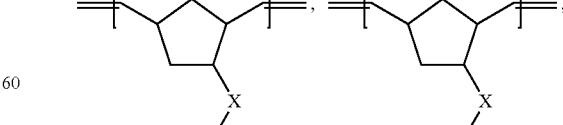

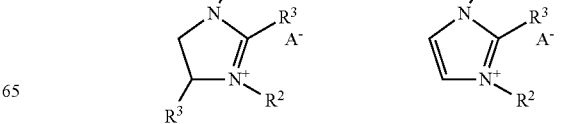

-continued
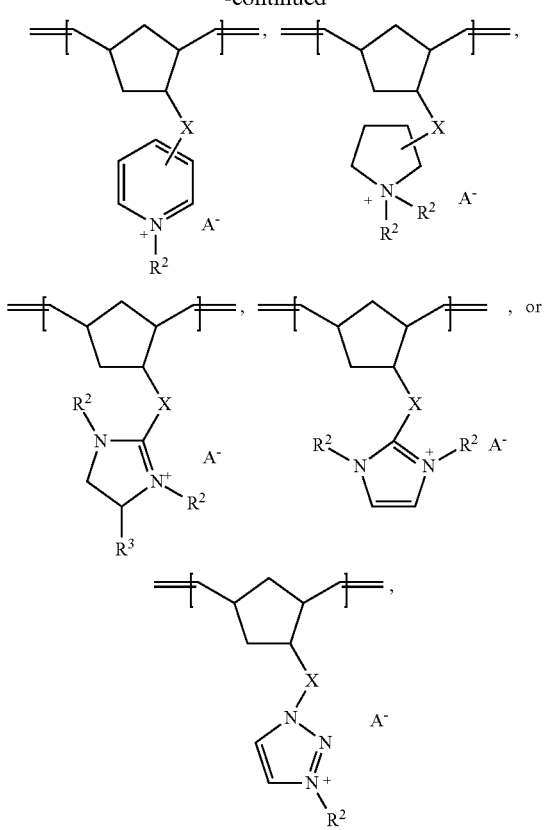
wherein R⁺ can be
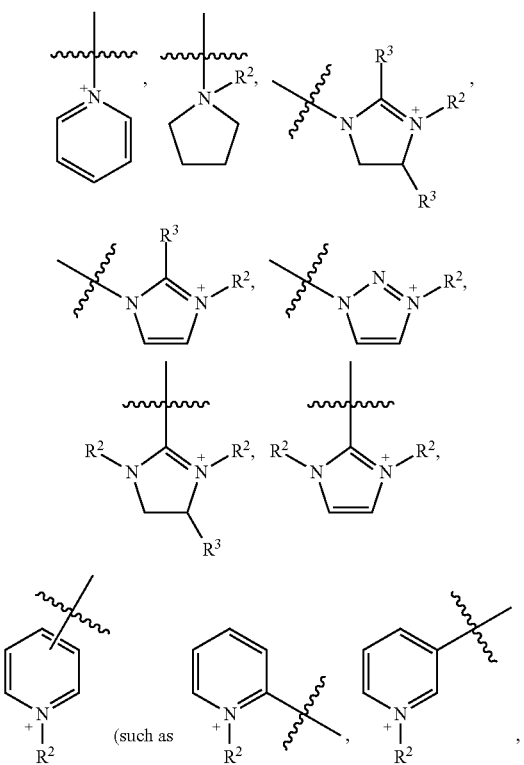
-continued
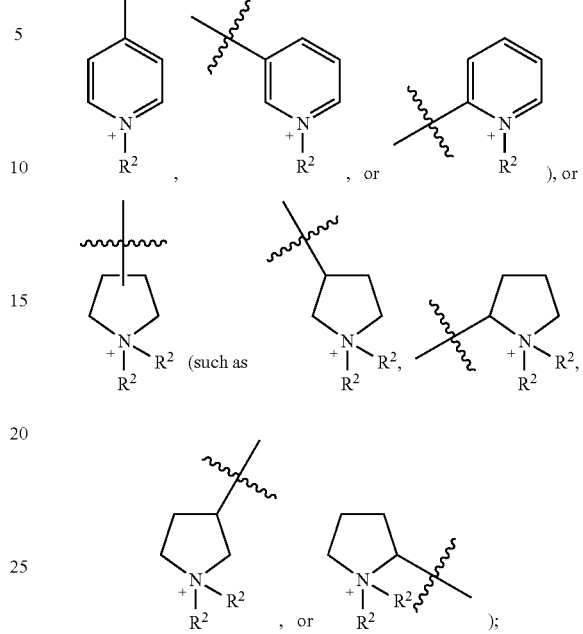
$A^-$ can be $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^-$; X is $-(CH_2)_i-Y-(CH_2)_j-$; Y can be $-O-$, $-S-$, $-CH_2-$, or $-NH-$; i and j can be independently 0, or an integer from 1 to 6; and, $R^2$ and $R^3$ can be independently hydrogen, or $C_{1-8}$ alkyl group.
According to embodiments of the disclosure, the second repeat unit can be
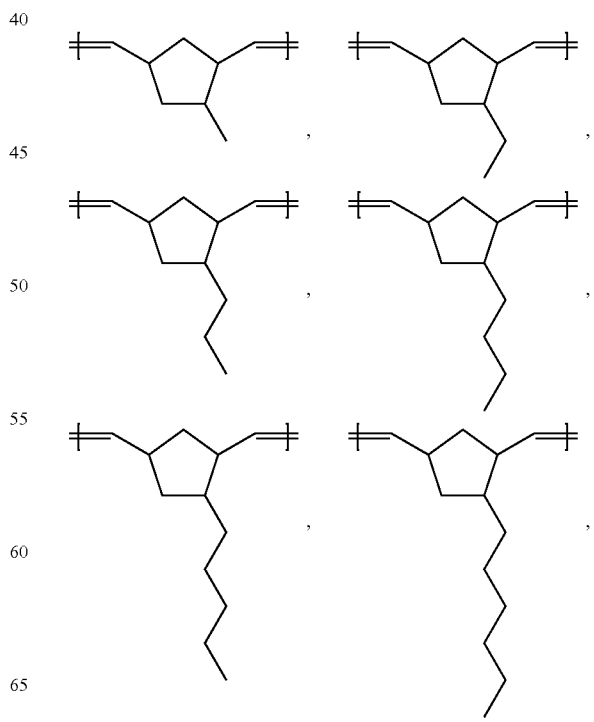

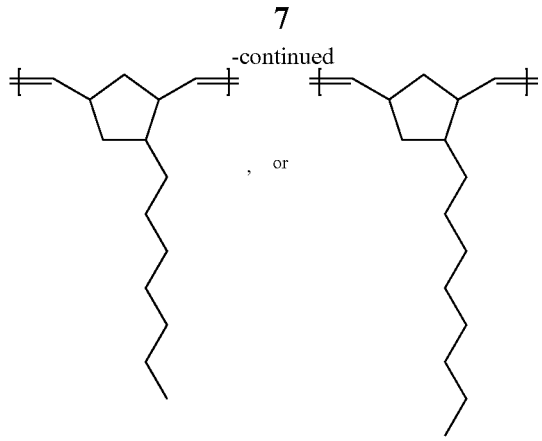, or

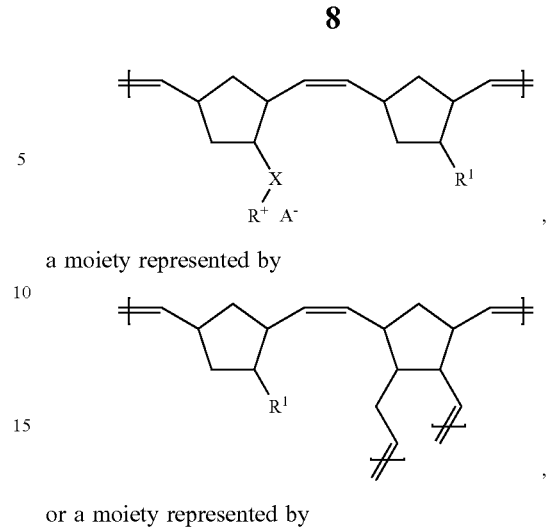

a moiety represented by or a moiety represented by

According to embodiments of the disclosure, the ratio between the first repeat unit and the second repeat unit of the polymer can be adjusted to achieve the desired characteristics of the polymer. For example, the ratio between the first repeat unit and the second repeat unit can be increased in order to enhance the electrical conductivity and the anion exchange capacity of the polymer. On the other hand, the ratio between the first repeat unit and the second repeat unit can be decreased in order to enhance the solubility, the mechanical strength, and the solvent selectivity of the polymer. The ratio between the first repeat unit and the second repeat unit can be between about 1:99 and 99:1, such as between about 10:90 and 90:10, between about 20:80 and 80:20, or between about 30:70 and 70:30.

According to embodiments of the disclosure, the polymer of the disclosure can further include a third repeat unit, wherein the third repeat unit can be

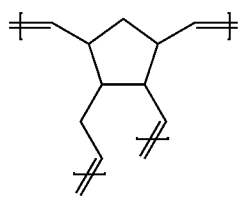

The portion represented by

of the first repeat unit, the second repeat unit, or the third repeat unit is bonded to the portion represented by

of the other first repeat unit, the other second repeat unit, or the other third repeat unit. In addition, the first repeat unit, the second repeat unit, and the third repeat unit can be arranged in a random fashion. For example, the polymer of the disclosure can have a moiety represented by According to embodiments of the disclosure, the ratio between the third repeat unit and the sum of the first repeat unit and the second repeat unit can be between about 0.1:100 and 5:100, such as between about 0.5:100 and 4:100, or between about 0.5:100 and 3:100. Due to the introduction of the third repeat unit, the polymer can have improved cross-linking degree and mechanical strength by adopting the third repeat unit. In addition, when the ratio between the third repeat unit and the sum of the first repeat unit and the second repeat unit is too high, the polymer would have too high a cross-linking degree and too high a molecular weight and cannot be redissolved in the subsequent process solvent.

According to embodiments of the disclosure, the cross-linking agent can be a compound having at least two imide groups, wherein the imide group can be phthalimide group, succinimide group, N-bromosuccinimide group, glutarimide, or maleimide group. For example, the cross-linking agent can be a compound having at least two maleimide groups (such as a compound having two maleimide groups). According to embodiments of the disclosure, the compound having two maleimide groups can be

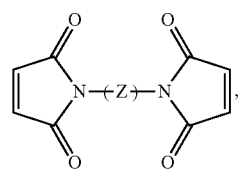

wherein Z can be

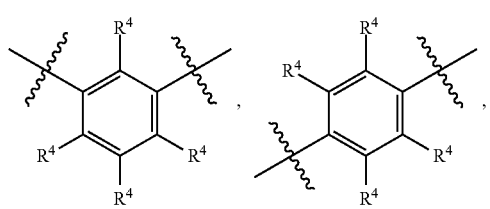

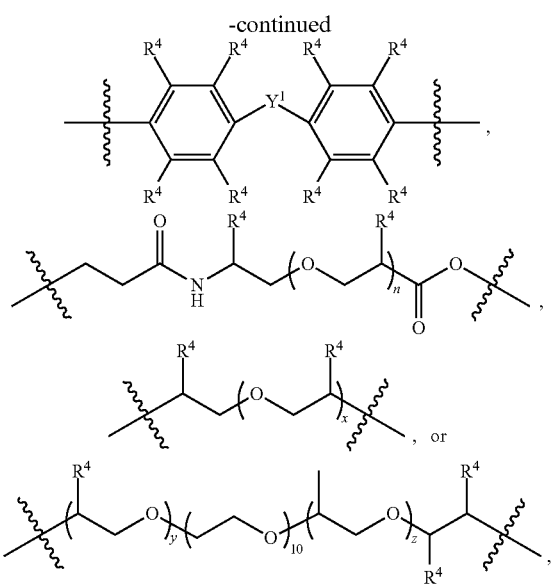

wherein $Y^1$ can be single bond, —O—, —S—, —CH$_2$—, or —NH—, $R^4$ can be independently hydrogen, or $C_{1-4}$ alkyl group; $n \geq 1$; x can be an integer from 1 to 12, y and z can be independently an integer from 1 to 5. For example, the cross-linking agent can be

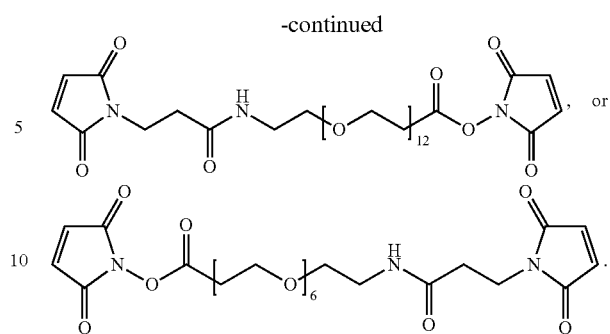

In addition, according to embodiments of the disclosure, the cross-linking agent can be a polymeric cross-linking agent having at least two maleimide groups. The polymeric cross-linking agent can be a reaction product of compound (a) and compound (b). Compound (a) can be

wherein Z can be

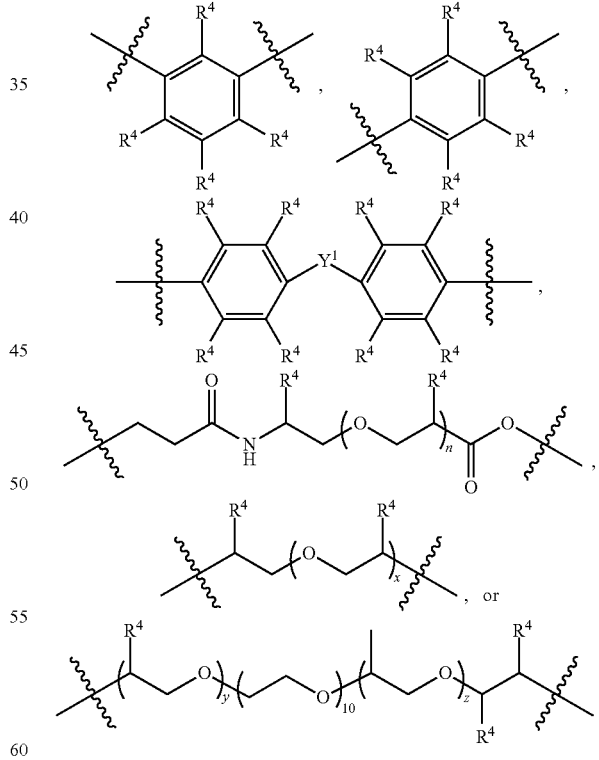

wherein $Y^1$ can be single bond, —O—, —S—, —CH$_2$—, or —NH—, $R^4$ can independently hydrogen, or $C_{1-4}$ alkyl group; and, $n \geq 1$; x can be an integer from 1 to 12; and, y and z can be independently an integer from 1 to 5. Compound (b) can be a compound represented by Formula (I) or Formula (II)

Formula (I)

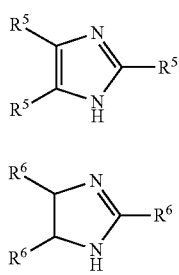

Formula (II)

, wherein $R^5$ is independently hydrogen, or $C_{1-4}$ alkyl group; and, $R^6$ is independently hydrogen, or $C_{1-4}$ alkyl group. For example, compound (b) can be

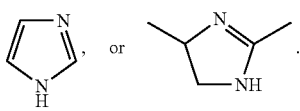

The polymeric cross-linking agent and the polymer can form an interpenetrating polymer network, thereby enhancing the mechanical strength and dimensional stability.

According to embodiments of the disclosure, the disclosure provides a method for preparing the aforementioned polymer. The method includes subjecting a composition to a polymerization, such as a ring opening metathesis polymerization (ROMP). The composition can include a first monomer having a structure of Formula (III) and a second monomer having a structure of Formula (IV)

Formula (III)

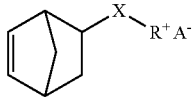

Formula (IV)

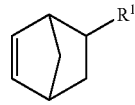

wherein, $R^+$ can be

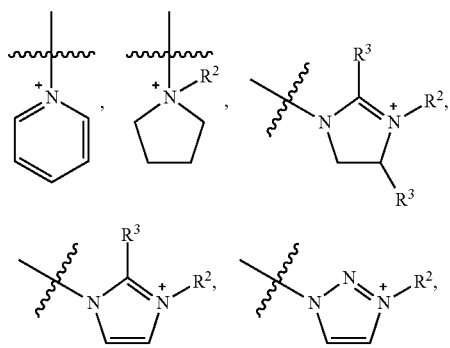

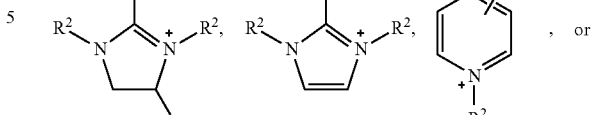

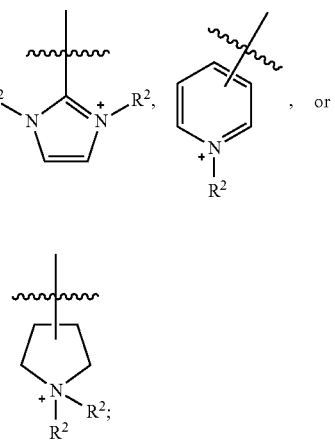

$A^-$ can be $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^-$; X can be $-(CH_2)_i-Y-(CH_2)_j-$, i and j can be independently 0, or an integer from 1 to 6, Y can be $-O-$, $-S-$, $-CH_2-$, or $-NH-$; $R^1$ can be independently $C_{1-8}$ alkyl group; and, $R^2$ and $R^3$ can be independently hydrogen, or $C_{1-8}$ alkyl group. In addition, a catalyst (such as the first generation or second generation Grubb's catalysts) can be further employed during the polymerization.

According to embodiments of the disclosure, the first monomer can be

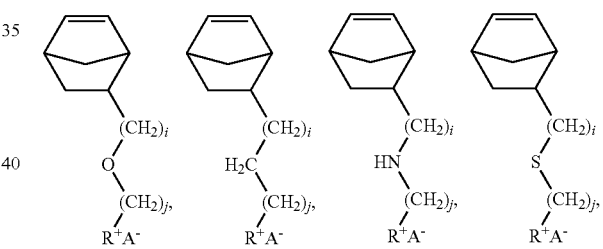

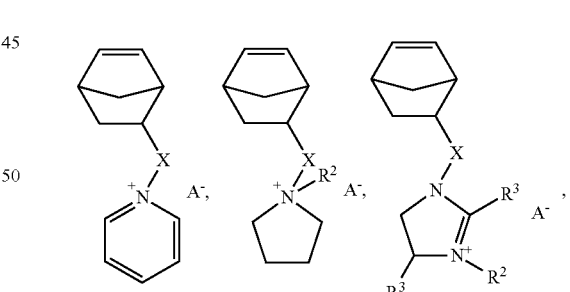

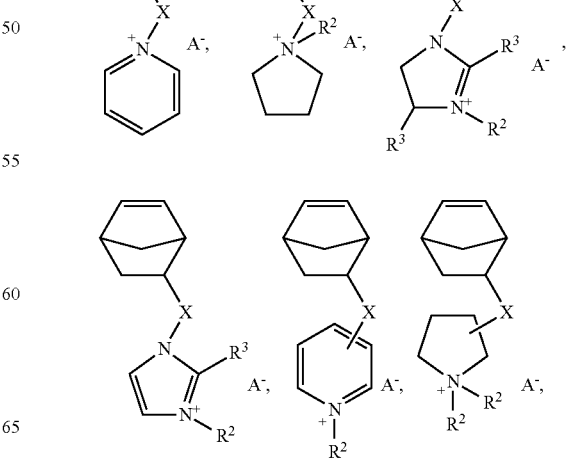

-continued

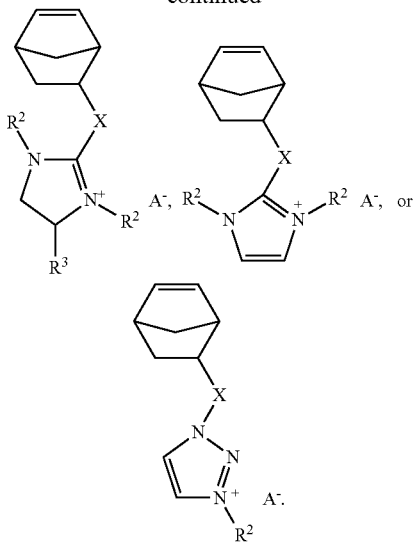

wherein, R⁺ can be

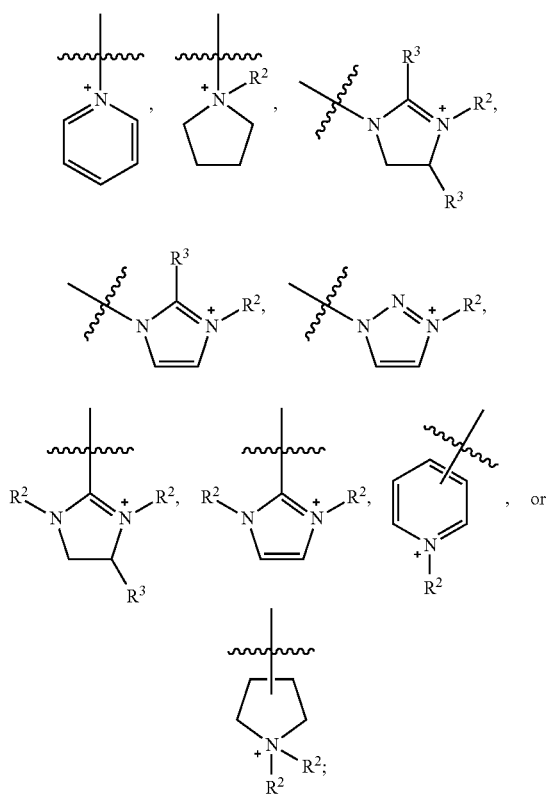

$A^-$ can be $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^-$; X can be $-(CH_2)_i-Y-(CH_2)_j-$, i and j can be independently 0, or an integer from 1 to 6, Y is —O—, —S—, —CH₂—, or —NH—; and, $R^2$ and $R^3$ are independently hydrogen, or $C_{1-8}$ alkyl group (such as: methyl, ethyl, propyl, isopropyl, n-butyl, sec-butyl, isobutyl, tert-butyl, pentyl, hexyl, cyclohexyl, cyclopentyl, heptyl, or octyl). In addition, the second monomer can be

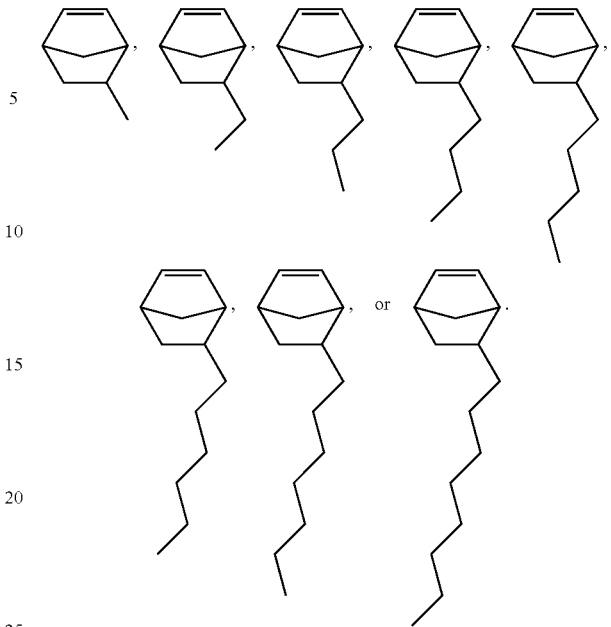

According to embodiments of the disclosure, the molar ratio between the first monomer and the second monomer can be between about 1:99 and 99:1, such as between about 10:90 and 90:10, between about 20:80 and 80:20, or between about 30:70 and 70:30.

In addition, according to embodiments of the disclosure, the composition can further include a third monomer, wherein the third monomer can be

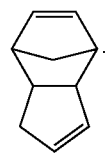

The molar ratio between the third monomer and the sum of the first monomer and the second monomer can be between about 0.1:100 and 5:100, such as between about 0.5:100 and 4:100, or between about 0.5:100 and 3:100.

According to embodiments of the disclosure, the method for preparing the ion exchange membrane includes the following steps. First, a composition is provided, wherein the composition includes the aforementioned polymer and the aforementioned cross-linking agent. Furthermore, the composition further includes a solvent, and the composition has a solid content between about 5 wt % and 50 wt %. In the composition, the cross-linking agent has a weight percentage between about 1 wt % and 30 wt % (such as between about 5 wt % and 30 wt %, or between about 5 wt % and 25 wt %), based on the weight of the polymer. When the amount of the cross-linking agent is too high, the ion exchange membrane becomes fragile. On the other hand, when the amount of the cross-linking agent is too low, the ion exchange membrane exhibits low film forming ability and mechanical strength.

Next, the composition is mixed and dispersed, and coated on a substrate (such as a glass substrate) to form a coating. Next, the coating is baked at high temperature to remove most of the solvent. Next, the coating is baked in a high temperature oven to remove residual solvent. Next, the coating was immersed in potassium hydroxide aqueous solution for 1-3 hours and deionized water at room temperature (about 25° C.) for 1-3 hours sequentially. After drying, the ion exchange membrane was obtained.

Below, exemplary embodiments will be described in detail so as to be easily realized by a person having ordinary knowledge in the art. The disclosure concept may be embodied in various forms without being limited to the exemplary embodiments set forth herein. Descriptions of well-known parts are omitted for clarity.

Preparation of Monomer with Cationic Group

Preparation Example 1

10 ml of dicyclopentadiene (0.074 mmol) and 20.15 ml of 1-allylimidazole (0.186 mmol) were added into a high-pressure reactor. After stirring at 180° C. for 8 hours, the result was purified by fractionation and column chromatography (using ethyl acetate (EA) and hexane (9:1) as the eluent), obtaining Compound (1) (colorless transparent viscous liquid). The synthesis pathway of the above reaction was as follows:

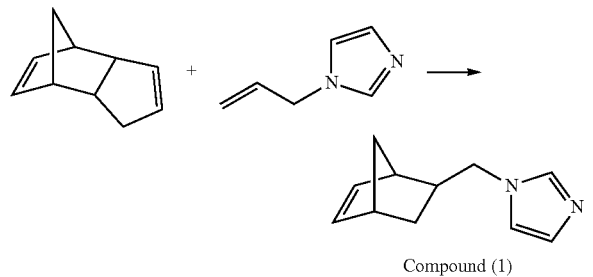

Compound (1)

Compound (1) was analyzed by nuclear magnetic resonance (NMR) spectroscopy and the result is as follows: $^1$H NMR (300 MHz, CDCl$_3$): δ 7.46 (d, J=15.3, 1H), 6.98 (m, 2H), 6.12 (m, 2H), 3.79 (m, 2H), 2.66 (m, 3H), 1.89 (m, 1H), 1.33 (m, 2H), 0.62 (m, 1H).

Next, 0.5 g of Compound (1) (2.87 mmol) and 0.268 ml of methyl iodide (4.30 mmol) were added into a reaction bottle. After stirring at room temperature for 8 hours and then removing residual methyl iodide by vacuum distillation, Compound (2) (yellow viscous liquid) was obtained. The synthesis pathway of the above reaction was as follows:

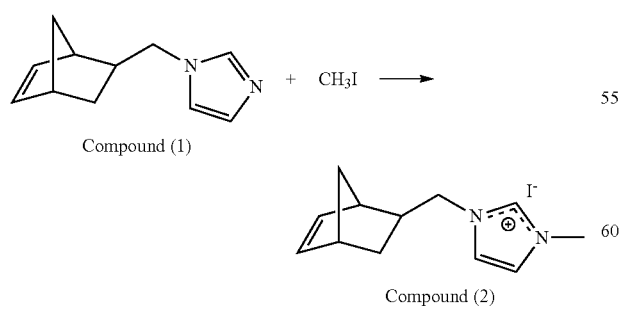

Compound (2)

Compound (2) was analyzed by nuclear magnetic resonance (NMR) spectroscopy and the result is as follows: $^1$H NMR (300 MHz, CDCl$_3$): δ 10.03 (d, J=12.0 Hz, 1H), 7.42 (m, 2H), 6.21 (m, 2H), 4.19 (m, 5H), 2.74 (m, 3H), 1.99 (m, 1H), 1.41 (m, 2H), 0.67 (m, 1H).

Preparation Example 2

15 ml of dimethylformamide (DMF) was added into a reaction bottle. Next, 1.7 g of sodium hydride (NaH) (0.00427 mol) was added into the reaction bottle at 0° C. Next, 2.122 g of 5-Norbornene-2-methanol (0.0171 mol) was added into the reaction bottle at 0° C. After stirring, 2 g of 1-methyl-2-(chloromethyl) imidazole (0.0154 mol) was added into the reaction bottle. After stirring for 12 hours, water was added into the reaction bottle to quench the reaction, and then the result was extracted by dichloromethane. After concentration, the result was purified by fractionation, obtaining Compound (3). The synthesis pathway of the above reaction was as follows:

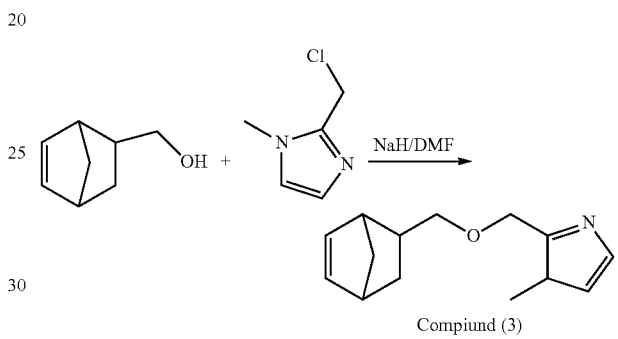

Compiund (3)

Compound (3) was analyzed by nuclear magnetic resonance (NMR) spectroscopy and the result is as follows: $^1$H NMR (300 MHz, CDCl$_3$): δ 6.90 (s, 2H), 6.10-5.76 (m, 2H), 4.59-4.81 (m, 2H), 3.71 (s, 3H), 3.51-3.00(m, 2H), 2.86-2.69(m, 2H), 2.33(m, 1H), 1.84-1.66 (m, 1H), 1.41-1.10(m, 2H), 0.47-0.43(m, 1H)

Next, 2 g of Compound (3) (9 mmol) was added into a reaction bottle and dissolved in dichloromethane. Next, 1 ml of methyl iodide (17 mmol) was added into the reaction bottle. After stirring at room temperature for 12 hours, residual methyl iodide and solvent were removed, obtaining Compound (4) (yellow viscous liquid). The synthesis pathway of the above reaction was as follows:

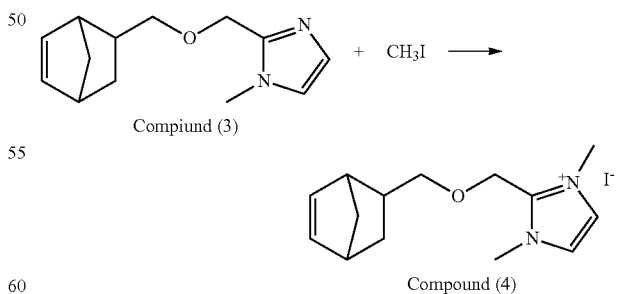

Compound (4)

Compound (4) was analyzed by nuclear magnetic resonance (NMR) spectroscopy and the result is as follows: $^1$H NMR (300 MHz, CDCl$_3$): δ 7.45 (s, 2H), 6.18-5.84(m, 2H), 4.90(s, 2H), 3.98(s, 6H), 3.68-3.20(m, 2H), 2.35(m, 1H), 1.86-1.78(m, 1H), 1.46-1.14(m, 4H), 0.52-0.51(m, 1H)

Preparation of Monomer with Non-Ionic Group

Preparation Example 3

13.4 ml of dicyclopentadiene (0.1 mmol) and 36 ml of 1-octene (0.23 mmol) were added into a high-pressure reactor. After stirring at 240° C. for 12 hours, the result was filtered through neutral alumina to remove the yellow suspension. Next, the result was purified by fractionation, obtaining Compound (5) (colorless transparent viscous liquid). The synthesis pathway of the above reaction was as follows:

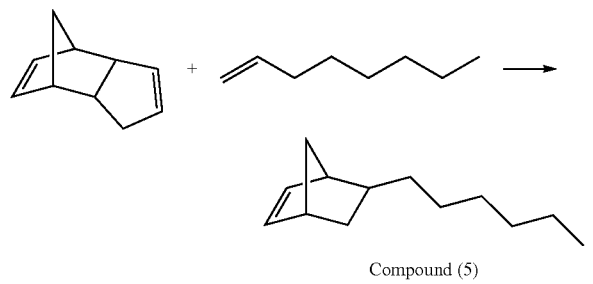

Compound (5)

Compound (5) was analyzed by nuclear magnetic resonance (NMR) spectroscopy and the result is as follows: $^1$H NMR (300 MHz, CDCl$_3$): δ 6.08 (m, 1H, endo), 6.04 (m, 1H, exo), 5.90 (m, 1H, endo), 2.67-2.77 (m, 2H), 2.48 (m, 1H, exo), 1.97 (m, 1H, endo), 1.80 (m, 1H, endo), 1.14-1.38 (m, 11H), 0.82-0.90(m, 3H), 0.43-0.50(m, 1H, endo)

Preparation of Cross-Linking Agent

Preparation Example 4

2.73 g of

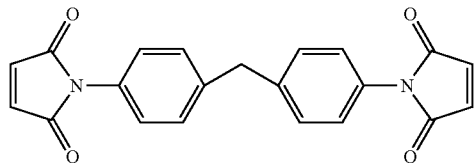 [SMILES: O=C1C=CC(=O)N1c1ccc(Cc2ccc(N3C(=O)C=CC3=O)cc2)cc1]

and 0.37 g of

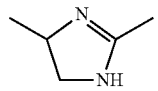

were added into a reaction bottle, wherein the molar ratio of the

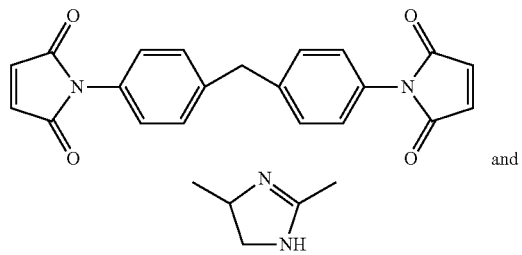

and

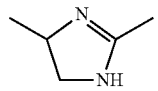

was 2:1). Next, 97 g of dimethylacetamide (DMAc) was added into the reaction bottle. After stirring at 100-150° C. for 5-10 hours, Polymeric cross-linking agent (1) was obtained.

Preparation of Polymer

Example 1

3.08 g of Compound (2) (9.74 mmole) and 0.19 g of Compound (5) (1.08 mmole) were added into a reaction bottle under a nitrogen atmosphere, wherein the molar ratio of Compound (2) and Compound (5) was about 9:1. Next, 30 ml of dichloromethane was added into the reaction bottle. Next, Grubbs's solution (9.2 mg, dissolved in 6 ml of dichloromethane) was slowly added into the reaction bottle at 30° C. After stirring for 4 hours, the result was slowly added into 250 ml of ethyl ether. After stirring for about 30 minutes and concentration, the result was washed with 100 ml of acetone, and then the solid was collected. After drying, Polymer (1) (having a repeat unit represented by

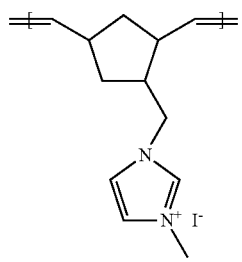

and a repeat unit represented by

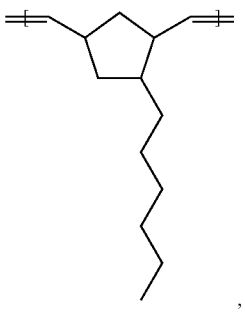

wherein the ratio of the repeat unit represented by

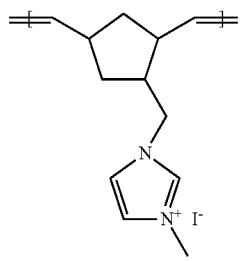

and the repeat unit represented by

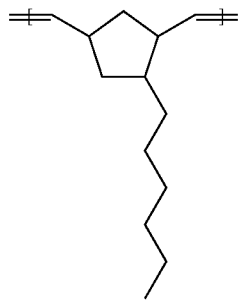

was about 9:1) was obtained. After measurement, the number average molecular weight (Mn) of Polymer (1) is about 110,000, and the polydispersity index (PDI) of Polymer (1) is about 1.4.

Example 2

Example 2 was performed in the same manner as in Example 1 except that the molar ratio of Compound (2) and Compound (5) was about 8:2, obtaining Polymer (2) (the ratio of the repeat unit represented by

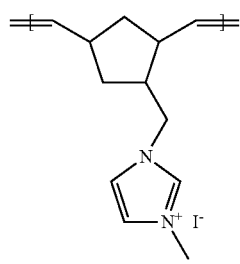

and the repeat unit represented by

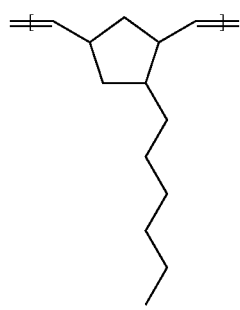

was about 8:2).

Example 3

Example 3 was performed in the same manner as in Example 1 except that the molar ratio of Compound (2) and Compound (5) was about 7:3, obtaining Polymer (3) (the ratio of the repeat unit represented by

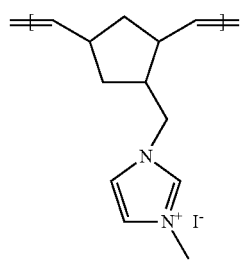

and the repeat unit represented by

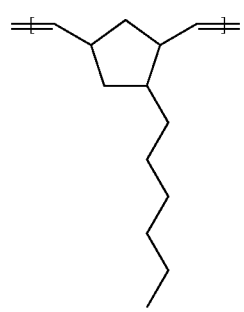

was about 7:3).

Example 4

Example 4 was performed in the same manner as in Example 1 except that the molar ratio of Compound (2) and Compound (5) was about 4:6, obtaining Polymer (4) (the ratio of the repeat unit represented by

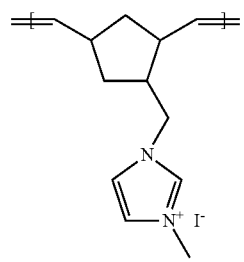

and the repeat unit represented by

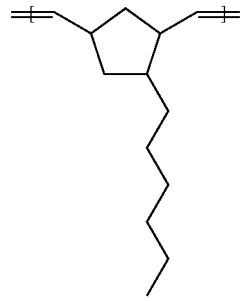

was about 4:6).

Example 5

Example 5 was performed in the same manner as in Example 1 except that the molar ratio of Compound (2) and Compound (5) was about 2:8, obtaining Polymer (5) (the ratio of the repeat unit represented by

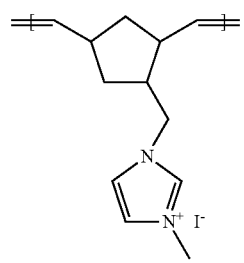

and the repeat unit represented by

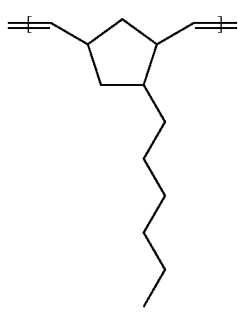

was about 2:8).

Example 6

3.53 g of Compound (4) (9.74 mmole) and 0.19 g of Compound (5) (1.08 mmole) were added into a reaction bottle under a nitrogen atmosphere, wherein the molar ratio of Compound (4) and Compound (5) was about 9:1. Next, 30 ml of dichloromethane was added into the reaction bottle. Next, Grubbs's solution (9.2 mg, dissolved in 6 ml of dichloromethane) was slowly added into the reaction bottle at 30° C. After stirring for 4 hours, the result was slowly added into 250 ml of ethyl ether. After stirring for about 30 minutes and concentration, the result was washed with 100 ml of acetone, and then the solid was collected. After drying, Polymer (6) (having a repeat unit represented by

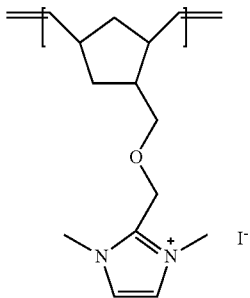

and a repeat unit represented by

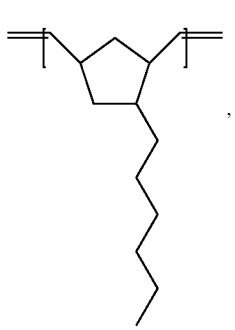

wherein the ratio of the repeat unit represented by

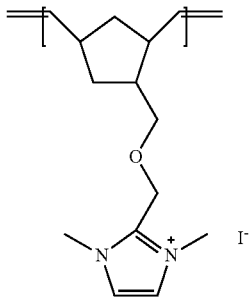

and the repeat unit represented by

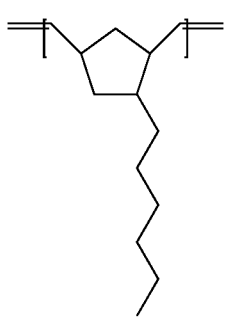

was about 9:1) was obtained.

Example 7

Example 7 was performed in the same manner as in Example 6 except that the molar ratio of Compound (4) and Compound (5) was about 6:4, obtaining Polymer (7) (the ratio of the repeat unit represented by

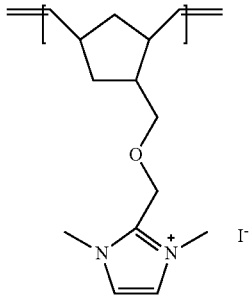

and the repeat unit represented by

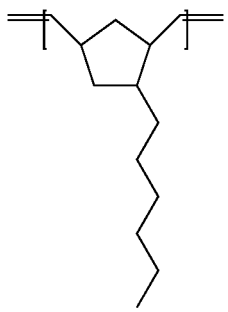

was about 6:4).

Example 8

Example 8 was performed in the same manner as in Example 6 except that the molar ratio of Compound (4) and Compound (5) was about 3:7, obtaining Polymer (8) (the ratio of the repeat unit represented by

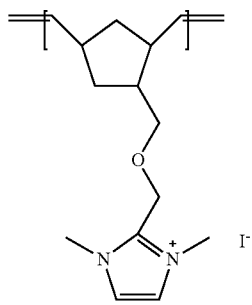

and the repeat unit represented by

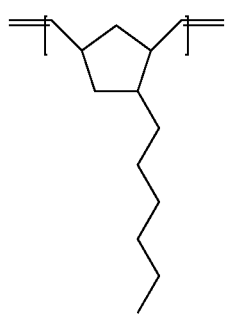

was about 3:7).

Example 9

3.08 g of Compound (2) (9.74 mmole), 0.19 g of Compound (5) (1.08 mmole), and 12 mg of dicyclopentadiene (0.097 mmole) were added into a reaction bottle under a nitrogen atmosphere, wherein the molar ratio of Compound (2), Compound (5), and dicyclopentadiene was about 9:1: 0.09. Next, 30 ml of dichloromethane was added into the reaction bottle. Next, Grubbs's solution (9.2 mg, dissolved in 6 ml of dichloromethane) was slowly added into the reaction bottle at 30° C. After stirring for 4 hours, the result was slowly added into 250 ml of ethyl ether. After stirring for about 30 minutes and concentration, the result was washed with 100 ml of acetone, and then the solid was collected. After drying, Polymer (9) (having a repeat unit represented by

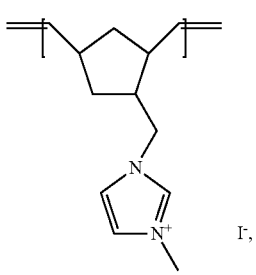

a repeat unit represented by

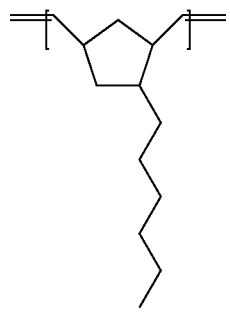

and a repeat unit represented by

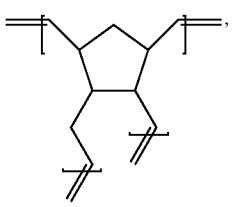

wherein the ratio of the repeat unit represented by

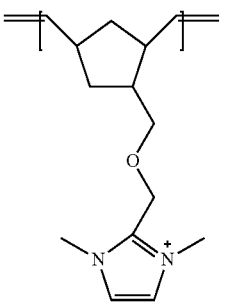

the repeat unit represented by

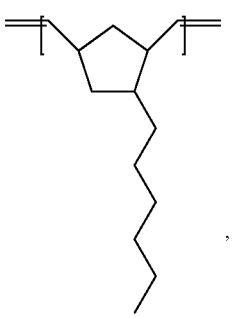

and the repeat unit represented by

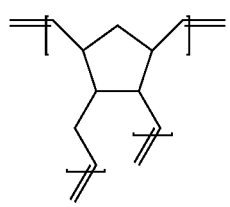

was about 9:1:0.09) was obtained.

Preparation of Anion Exchange Membrane

Example 10

100 parts by weight of polymer (1) (prepared from Example 1) was added into a reaction bottle, and dissolved in 667 parts by weight of dimethylacetamide (DMAc). Next, 10 parts by weight of polymeric cross-linking agent (1) (prepared from Preparation Example 4) was added into the reaction bottle. Next, the result was mixed and distributed via a high speed homogenizer, and then defoamed, obtaining a solution. Next, the solution was coated on a glass substrate via spin coating, forming a coating. Next, the coating was baked at 40-150° C. to remove most of the solvent. Next, the coating was baked at 120-200° C. for 1-6 hours to remove residual solvent. Next, the coating was immersed in potassium hydroxide aqueous solution at room temperature for 1.5 hours and deionized water at room temperature for 1.5 hours sequentially to ensure no solvent remained in the coating. After drying, Anion exchange membrane (1) was obtained. Next, the ionic conductivity of Anion exchange membrane (1) was measured, and the result is shown in Table 1.

Example 11-14

Examples 11-14 were performed in the same manner as in Example 10 except that Polymers (2)-(5) were substituted for Polymer (1) respectively, obtaining Anion exchange membranes (2)-(5). Next, the ionic conductivity of Anion exchange membranes (2)-(5) were measured, and the results are shown in Table 1. Furthermore, the tensile strength and anti-rupture strength of Anion exchange membrane (3) were measured according to ASTM D882-02, and the result is shown in Table 2.

TABLE 1

| ratio of the repeat unit represented by 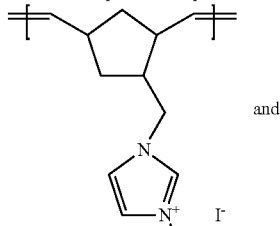 and the repeat unit represented by 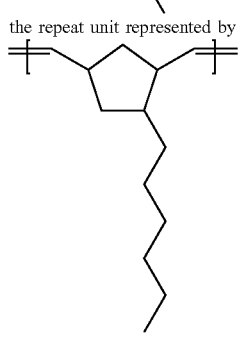 | | ionic conductivity (S/cm) |
|---|---|---|
| Anion exchange membrane (1) | 9:1 | 0.13 |
| Anion exchange membrane (2) | 8:2 | — |
| Anion exchange membrane (3) | 7:3 | 0.06 |
| Anion exchange membrane (4) | 4:6 | 0.05 |
| Anion exchange membrane (5) | 2:8 | 0.005 |

As shown in Table 1, with the increase of the ratio of the repeat unit represented by

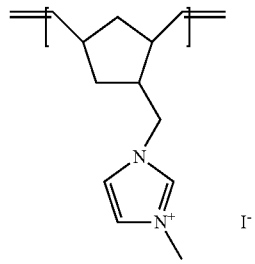

and the repeat unit represented by

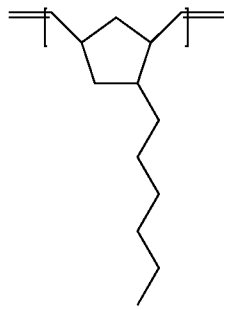

the ionic conductivity of the anion exchange membrane is improved.

Example 15

Example 15 was performed in the same manner as in Example 12 except that 7 parts by weight of Polymeric cross-linking agent (1) was substituted for 10 parts by weight of Polymeric cross-linking agent (1), obtaining Anion exchange membrane (6). Next, the tensile strength and anti-rupture strength of Anion exchange membrane (6) were measured according to ASTM D882-02, and the result is shown in Table 2.

Example 16

Example 16 was performed in the same manner as in Example 12 except that 20 parts by weight of Polymeric cross-linking agent (1) was substituted for 10 parts by weight of Polymeric cross-linking agent (1), obtaining Anion exchange membrane (7). Next, the tensile strength and anti-rupture strength of Anion exchange membrane (7) were measured according to ASTM D882-02, and the result is shown in Table 2.

Example 17

Example 17 was performed in the same manner as in Example 12 except that 25 parts by weight of Polymeric cross-linking agent (1) was substituted for 10 parts by weight of Polymeric cross-linking agent (1), obtaining Anion exchange membrane (8). Next, the tensile strength and anti-rupture strength of Anion exchange membrane (8) were measured according to ASTM D882-02, and the result is shown in Table 2.

TABLE 2

| | polymeric cross-linking agent (parts by weight) | tensile strength (MPa) | anti-rupture strength (MPa) |
|---|---|---|---|
| Anion exchange membrane (3) | 10 | 25.59 | 36.57 |
| Anion exchange membrane (6) | 7 | 32.51 | 44.35 |
| Anion exchange membrane (7) | 20 | 30.19 | 45.77 |
| Anion exchange membrane (8) | 25 | 35.22 | 47.32 |

As shown in Table 2, with the increase of the concentration of the polymeric cross-linking agent, the mechanical strength (such as tensile strength and anti-rupture strength) is improved. Therefore, according to Tables 1 and 2, the anion exchange membrane of the disclosure exhibits superior ionic conductivity and mechanical strength.

Example 18

100 parts by weight of polymer (6) (prepared from Example 6) was added into a reaction bottle, and dissolved in 667 parts by weight of dimethylacetamide (DMAc). Next, 10 parts by weight of Polymeric cross-linking agent (1) (prepared from Preparation Example 4) was added into the reaction bottle. Next, the result was mixed and distributed via a high speed homogenizer, and then defoamed, obtaining a solution. Next, the solution was coated on a glass substrate via spin coating, forming a coating. Next, the coating was baked at 40-150° C. to remove most of the solvent. Next, the coating was baked at 120-200° C. for 1-6 hours to remove residual solvent. Next, the coating was immersed in potassium hydroxide aqueous solution at room temperature for 1.5 hours and deionized water at room temperature for 1.5 hours sequentially to ensure no solvent remained in the coating. After drying, Anion exchange membrane (9) was obtained. Next, the ionic conductivity and dimensional stability of Anion exchange membrane (9) was measured, and the result is shown in Table 3.

Examples 19-20

Examples 19-20 were performed in the same manner as in Example 18 except that Polymers (7) and (8) were substituted for Polymer (6) respectively, obtaining Anion exchange membranes (10) and (11). Next, the ionic conductivity and dimensional stability of Anion exchange membranes (10) and (11) were measured, and the results are shown in Table 3.

TABLE 3

| | ionic conductivity | dimensional shrinkage (%) (measured at 25° C.) | | dimensional shrinkage (%) (measured at 80° C.) | |
|---|---|---|---|---|---|
| | (S/cm) | area | thickness | area | thickness |
| anion exchange membrane (9) | 0.09 | 20 | 9 | 24 | 31 |
| anion exchange membrane (10) | 0.02 | 0 | 13 | 0 | 4 |
| anion exchange membrane (11) | 0.004 | 15 | 6 | 4.5 | 21 |

As shown in Table 3, with the increase of the ratio of the repeat unit represented by

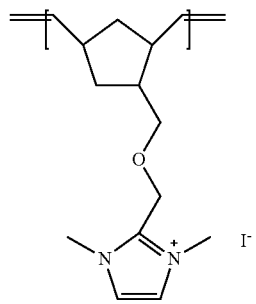

and the repeat unit represented by

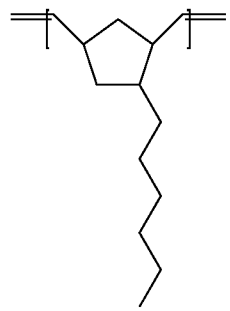

the ionic conductivity of the anion exchange membrane is improved. In addition, the anion exchange membrane of the disclosure also exhibits high dimensional stability.

Accordingly, since the ion exchange membrane is prepared from a polymer with a stable cyclic conjugated cationic group (such as an imidazole group) and a cross-linking agent has at least two functional groups which can be reacted with the cyclic conjugated cationic group, the ion exchange membrane exhibits high film forming ability, ionic conductivity, mechanical strength, and dimensional stability. Hence, the ion exchange membrane is suitable for use in a fuel cell or a purification and separation device.

It will be clear that various modifications and variations can be made to the disclosed methods and materials. It is intended that the specification and examples be considered as exemplary only, with the true scope of the disclosure being indicated by the following claims and their equivalents.

What is claimed is:
1. An ion exchange membrane, comprising a reaction product of a polymer and a cross-linking agent, wherein the polymer comprises a first repeat unit and a second repeat unit, wherein the first repeat unit is

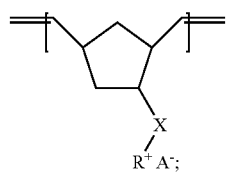

the second repeat unit is

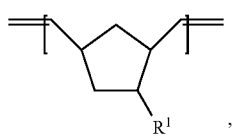

wherein R⁺ is

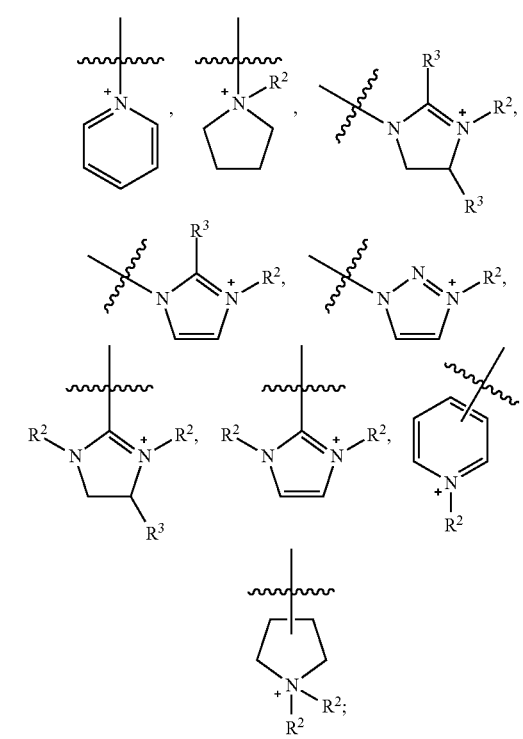

$A^-$ is $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^-$; X is $-(CH_2)_i-Y-(CH_2)_j-$, i and j is independently an integer from 1 to 6, Y is $-O-$, $-S-$, $-CH_2-$, or $-NH-$; $R^1$ is independently $C_{1-8}$ alkyl group; and, $R^2$ and $R^3$ are independently hydrogen, or $C_{1-8}$ alkyl group; and, the cross-linking agent is a compound having at least two imide groups.

2. The ion exchange membrane as claimed in claim 1, wherein the ratio between the first repeat unit and the second repeat unit is between 1:99 and 99:1.

3. The ion exchange membrane as claimed in claim 1, wherein $R^1$ is methyl, ethyl, propyl, isopropyl, n-butyl, sec-butyl, isobutyl, tert-butyl, pentyl, hexyl, cyclohexyl, cyclopentyl, heptyl, or octyl.

4. The ion exchange membrane as claimed in claim 1, wherein $R^2$ and $R^3$ are independently hydrogen, methyl, ethyl, propyl, isopropyl, n-butyl, sec-butyl, isobutyl, tert-butyl, pentyl, hexyl, cyclohexyl, cyclopentyl, heptyl, or octyl.

5. The ion exchange membrane as claimed in claim 1, wherein the first repeat unit is

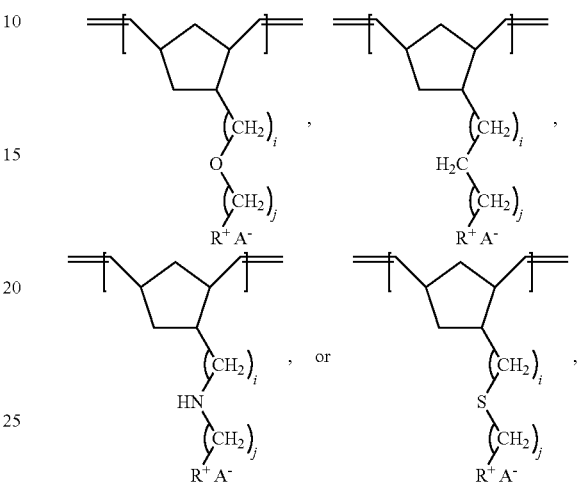

wherein R⁺ is

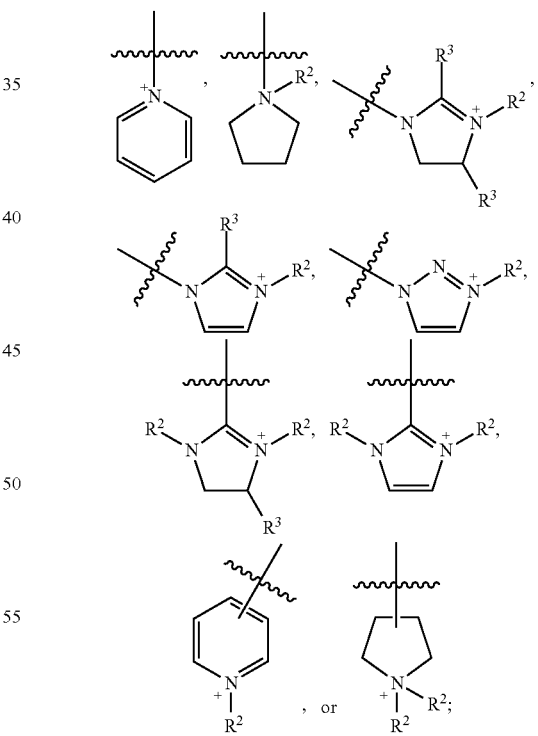

$A^-$ is $F^-$, $Cl^-$, $Br^-$, $I^-$, $OH^-$, $HCO_3^-$, $HSO_4^-$, $SbF_6^-$, $BF_4^-$, $H_2PO_4^-$, $H_2PO_3^-$, or $H_2PO_2^{31}$ ; i and j is independently an integer from 1 to 6; and, $R^2$ and $R^3$ are independently hydrogen, or $C_{1-8}$ alkyl group.

6. The ion exchange membrane as claimed in claim 1, wherein the first repeat unit is

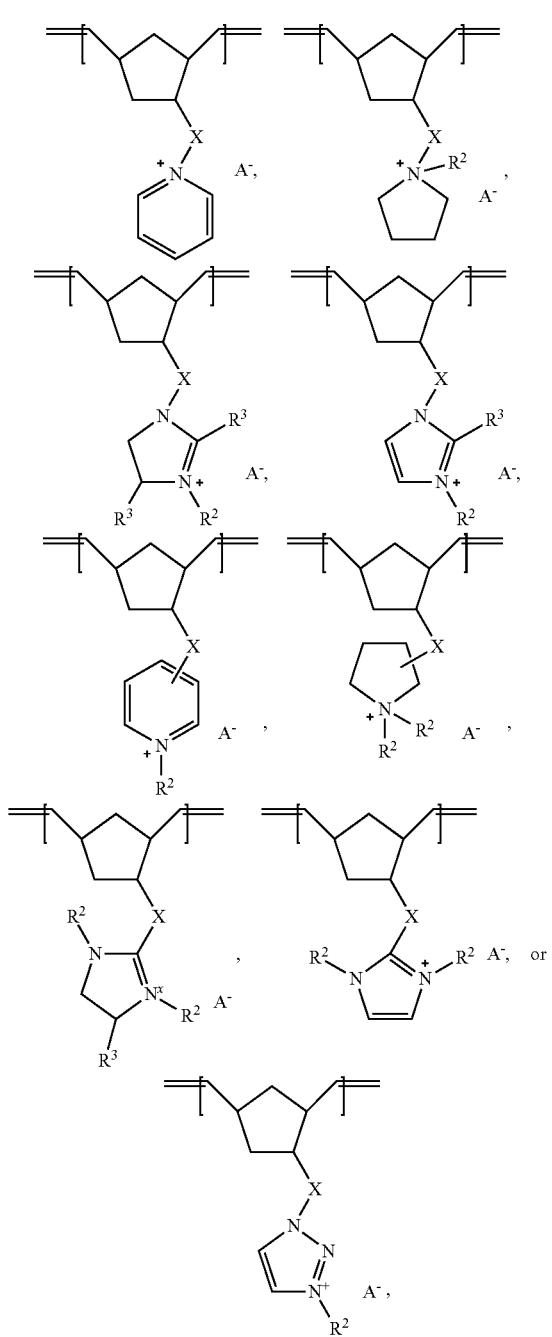

wherein A⁻ is F⁻, Cl⁻, Br⁻, I⁻, OH⁻, HCO$_3^-$, HSO$_4^-$, SbF$_6^-$, BF$_4^-$, H$_2$PO$_4^-$, H$_2$PO$_3^-$, or H$_2$PO$_2^-$; X is —(CH$_2$)$_i$—Y—(CH$_2$)$_j$—, i and j is independently an integer from 1 to 6, Y is —O—, —S—, —CH$_2$—, or —NH—; and, R$^2$ and R$^3$ are independently hydrogen, or C$_{1-8}$ alkyl group.

7. The ion exchange membrane as claimed in claim 1, wherein the second repeat unit is

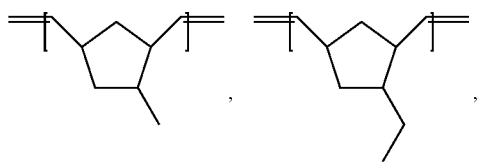

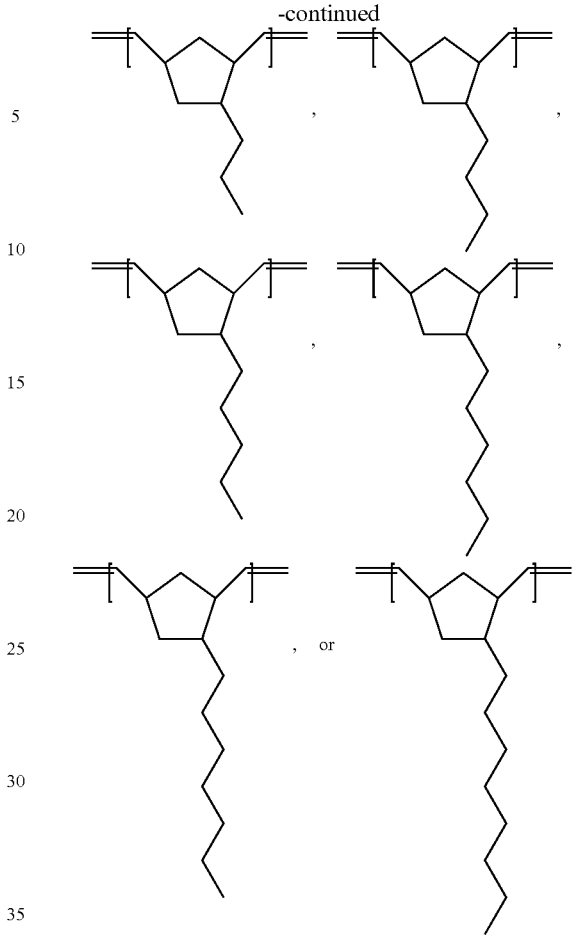

8. The ion exchange membrane as claimed in claim 1, wherein the polymer further comprising a third repeat unit, wherein the third repeat unit is

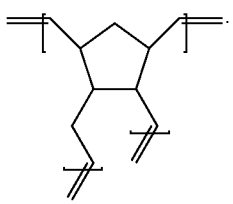

9. The ion exchange membrane as claimed in claim 8, wherein the ratio between the third repeat unit and the sum of the first repeat unit and the second repeat unit is between 0.1:100 and 5:100.

10. The ion exchange membrane as claimed in claim 1, wherein the imide group in the cross-linking agent is maleimide group.

11. The ion exchange membrane as claimed in claim 10, wherein the cross-linking agent is

wherein Z is

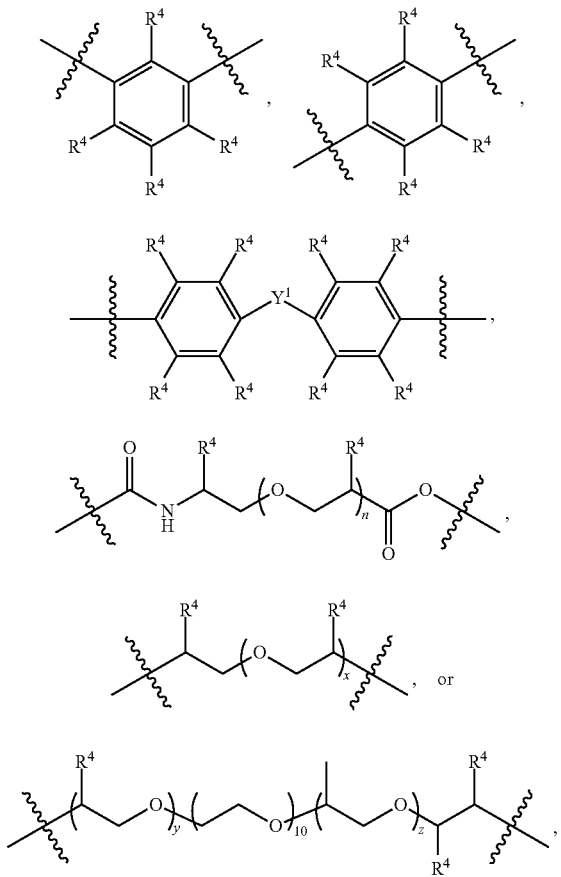

wherein $Y^1$ is single bond, —O—, —S—, —CH$_2$—, or —NH—, $R^4$ is independently hydrogen, or C$_{1-4}$ alkyl group; n≥1; x is an integer from 1 to 12; and, y and z are independently an integer from 1 to 5.

12. The ion exchange membrane as claimed in claim 1, wherein the cross-linking agent is a reaction product of compound (a) and compound (b), wherein compound (a) is

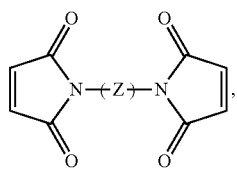

wherein Z is

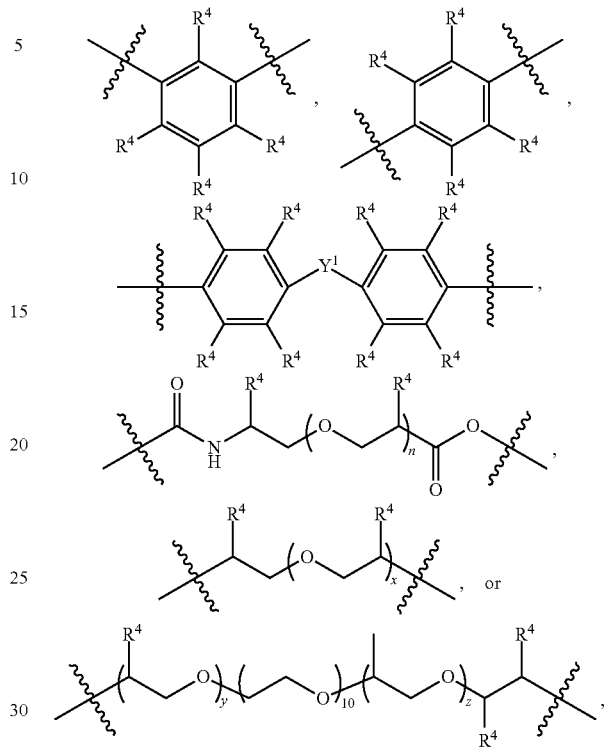

wherein $Y^1$ is single bond, —O—, —S—, —CH$_2$—, or —NH—, $R^4$ is independently hydrogen, or C$_{1-4}$ alkyl group; and, n≥1; x is an integer from 1 to 12; and, y and z are independently an integer from 1 to 5, wherein compound (b) has a structure represented by Formula (I) or Formula (II)

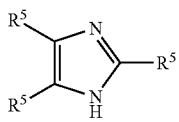 Formula (I)

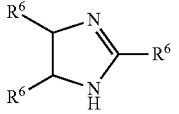 Formula (II)

wherein $R^5$ is independently hydrogen, or C$_{1-4}$ alkyl group; and, $R^6$ is independently hydrogen, or C$_{1-4}$ alkyl group.

* * * * *